United States Patent
Caruana

[19]

[11] Patent Number: 6,047,287
[45] Date of Patent: Apr. 4, 2000

[54] ITERATED K-NEAREST NEIGHBOR METHOD AND ARTICLE OF MANUFACTURE FOR FILLING IN MISSING VALUES

[75] Inventor: Richard Caruana, Pittsburgh, Pa.

[73] Assignee: Justsystem Pittsburgh Research Center, Pittsburgh, Pa.

[21] Appl. No.: 09/071,922

[22] Filed: May 5, 1998

[51] Int. Cl.[7] .................................................. G06F 17/30
[52] U.S. Cl. ...................................... 707/5; 707/3; 707/6
[58] Field of Search ........................................ 707/3, 5, 6

[56] References Cited

U.S. PATENT DOCUMENTS

| | | | |
|---|---|---|---|
| 4,528,639 | 7/1985 | Edwards | 364/723 |
| 4,802,109 | 1/1989 | Machida | 364/723 |
| 5,125,042 | 6/1992 | Kerr et al. | 382/47 |
| 5,305,395 | 4/1994 | Mahoney et al. | 382/27 |
| 5,440,742 | 8/1995 | Schwanke | 395/650 |
| 5,513,120 | 4/1996 | Berlad | 364/723 |
| 5,519,647 | 5/1996 | DeVille | 364/721 |
| 5,644,232 | 7/1997 | Smith | 324/309 |

*Primary Examiner*—Jean R. Homere
*Attorney, Agent, or Firm*—Webb Ziesenhein Logsdom Orkin & Hanson, P.C.

[57] ABSTRACT

A method for filling in missing attribute values in a data set array of cases and attribute positions includes the steps of, for a first case which includes an empty attribute position, determining a first set of K nearest neighbor cases which have known values for the corresponding attribute position as the empty attribute position in the first case; determining a filled in attribute value from the first set of K nearest neighbor cases for the empty attribute position of the first case; determining a second set of K nearest neighbor cases to the first case which have known values for the corresponding attribute position as the empty attribute position in the first case; and revising the filled in attribute value of the first case with an attribute value determined from the second set of K nearest neighbor cases. The revision process is typically repeated until the filled in values stop improving or until a preset limit on the number of iterations is reached.

45 Claims, 9 Drawing Sheets

| | | |
|---|---|---|
| NAME | JOHN SMITH |
| SOC_NUM: | 166-66-6666 |
| AGE: | MISSING |
| ANNUAL_INCOME: | $50K |
| TIME_AT_CURRENT_JOB: | 5 YEARS |
| TOTAL_DEBT: | $100K |
| NO_OF_PRIOR_LOAN_DEFAULTS: | NONE |
| SINGLE_OR_MARRIED: | SINGLE |
| HIGHEST_DEGREE_EARNED: | MISSING |
| HOME_OWNER: | YES |

FIG. 1

| | A | B | C | D | E |
|---|---|---|---|---|---|
| 1 | 2 | 4 | 9 | 6 | 5 |
| 2 | 6 | 8 | 1 | 9 | 7 |
| 3 | 6 | 7 | 1 | 8 | 9 |
| 4 | 9 | 2 | 6 | 2 | 3 |
| 5 | 1 | 4 | 8 | 5 | 6 |
| 6 | 9 | 2 | 6 | 3 | 2 |
| 7 | 1 | 3 | 9 | 4 | 6 |
| 8 | 8 | 2 | 5 | 3 | 2 |
| 9 | 5 | 8 | 3 | 9 | 7 |

|   | A   | B | C | D | E |
|---|-----|---|---|---|---|
| 1 | *P* | 4 | 9 | 6 | 5 |
| 2 | 6   | 8 | 1 | 9 | 7 |
| 3 | 6   | 7 | 1 | 8 | 9 |
| 4 | 9   | 2 | 6 | 2 | 3 |
| 5 | 1   | 4 | 8 | 5 | 6 |
| 6 | 9   | 2 | 6 | 3 | 2 |
| 7 | 1   | 3 | 9 | 4 | 6 |
| 8 | 8   | 2 | 5 | 3 | 2 |
| 9 | 5   | 8 | 3 | 9 | 7 |

|   | A   | B | C | D | E |
|---|-----|---|---|---|---|
| 1 | *1* | 4 | 9 | 6 | 5 |
| 2 | 6   | 8 | 1 | 9 | 7 |
| 3 | 6   | 7 | 1 | 8 | 9 |
| 4 | 9   | 2 | 6 | 2 | 3 |
| 5 | 1   | 4 | 8 | 5 | 6 |
| 6 | 9   | 2 | 6 | 3 | 2 |
| 7 | 1   | 3 | 9 | 4 | 6 |
| 8 | 8   | 2 | 5 | 3 | 2 |
| 9 | 5   | 8 | 3 | 9 | 7 |

|   | A   | B   | C   | D   | E   |
|---|-----|-----|-----|-----|-----|
| 1 | 2   | *4* | 9   | 6   | 5   |
| 2 | *5* | 8   | 1   | 9   | 7   |
| 3 | *5* | 7   | 1   | *9* | *7* |
| 4 | 9   | *2* | 6   | 2   | 3   |
| 5 | 1   | 4   | 8   | 5   | 6   |
| 6 | 9   | 2   | 6   | *2* | 2   |
| 7 | *1* | 3   | 9   | 4   | 6   |
| 8 | 8   | 2   | *9* | 3   | *2* |
| 9 | 5   | *2* | 3   | *9* | 7   |

|   | A | B | C | D | E |
|---|---|---|---|---|---|
| 1 | 2 | 4 | 9 | 6 | 5 |
| 2 | 6 | 8 | 1 | 9 | 7 |
| 3 | 6 | 7 | 1 | 8 | 9 |
| 4 | 9 | 2 | 6 | 2 | 3 |
| 5 | 1 | 4 | 8 | 5 | 6 |
| 6 | 9 | 2 | 6 | 3 | 2 |
| 7 | 1 | 3 | 9 | 4 | 6 |
| 8 | 8 | 2 | 5 | 3 | 2 |
| 9 | 5 | 8 | 3 | 9 | 7 |

FIG. 7b

|     | A   | B   | C   | D   | E   |
| --- | --- | --- | --- | --- | --- |
| 1   | 2   | *4* | 9   | 6   | 5   |
| 2   | *5* | 8   | 1   | 9   | 7   |
| 3   | *5* | 7   | 1   | *9* | *7* |
| 4   | 9   | *2* | 6   | 2   | 3   |
| 5   | 1   | 4   | 8   | 5   | 6   |
| 6   | 9   | 2   | 6   | *2* | 2   |
| 7   | *1* | 3   | 9   | 4   | 6   |
| 8   | 8   | 2   | *6* | 3   | *3* |
| 9   | 5   | *8* | 3   | *5* | 7   |

FIG. 8a

|     | A   | B   | C   | D   | E   |
| --- | --- | --- | --- | --- | --- |
| 1   | 2   | *4* | 9   | 6   | 5   |
| 2   | *5* | 8   | 1   | 9   | 7   |
| 3   | *5* | 7   | 1   | *9* | *7* |
| 4   | 9   | *2* | 6   | 2   | 3   |
| 5   | 1   | 4   | 8   | 5   | 6   |
| 6   | 9   | 2   | 6   | *2* | 2   |
| 7   | *1* | 3   | 9   | 4   | 6   |
| 8   | 8   | 2   | *9* | 3   | *2* |
| 9   | 5   | *2* | 3   | *9* | 7   |

FIG. 8b

|   | A | B | C | D | E |
|---|---|---|---|---|---|
| 1 | 2 | *4* | 9 | 6 | 5 |
| 2 | *5* | 8 | 1 | 9 | 7 |
| 3 | *5* | 7 | 1 | *9* | *7* |
| 4 | 9 | *2* | 6 | 2 | 3 |
| 5 | 1 | 4 | 8 | 5 | 6 |
| 6 | 9 | 2 | 6 | *2* | 2 |
| 7 | *1* | 3 | 9 | 4 | 6 |
| 8 | 8 | 2 | *6* | 3 | *3* |
| 9 | 5 | *8* | 3 | *9* | 7 |

FIG. 9a

|   | A | B | C | D | E |
|---|---|---|---|---|---|
| 1 | 2 | 4 | 9 | 6 | 5 |
| 2 | 6 | 8 | 1 | 9 | 7 |
| 3 | 6 | 7 | 1 | 8 | 9 |
| 4 | 9 | 2 | 6 | 2 | 3 |
| 5 | 1 | 4 | 8 | 5 | 6 |
| 6 | 9 | 2 | 6 | 3 | 2 |
| 7 | 1 | 3 | 9 | 4 | 6 |
| 8 | 8 | 2 | 5 | 3 | 2 |
| 9 | 5 | 8 | 3 | 9 | 7 |

ITERATED K-NEAREST NEIGHBOR METHOD AND ARTICLE OF MANUFACTURE FOR FILLING IN MISSING VALUES

BACKGROUND OF THE INVENTION

1. Field of the Invention

The present invention relates to a method and article of manufacture for filling in missing values in an array, and more particularly, to filling in missing attribute values in a data set array of cases and attribute positions.

2. Discussion of the Related Art

As data set applications continue to increase in variety and use, methods to increase their efficiency and accuracy become necessary. Common examples of these data set applications presently in use include a variety of database applications including consumer databases, banking transaction databases, medical patient databases, and Internet information retrieval databases.

One problem which reduces accuracy and efficiency in data set application functionality results from missing values. It is known in the art of estimating values for missing variables to use statistical regression to estimate the missing values, then repeat the regression, and re-estimate the missing values from the subsequent regression. This is a parametric approach which handles continuous variables well, but results in extrapolation problems for other types of missing variables, and causes the estimates to diverge.

For these reasons, the accuracy of certain estimation applications is increased with the use of non-parametric approaches, such as the K-Nearest Neighbor (hereinafter "KNN") method to fill in missing values. This approach makes few statistical assumptions, reduces the possibility of extrapolation problems and allows the estimation of any kind of missing variable.

SUMMARY OF THE INVENTION

Accordingly, the present invention is directed to a method for filling in missing attribute values in a data set array that substantially obviates one or more of the problems due to limitations and disadvantages of the related art. A general computer system implementing such method, as well as a computer program, are also considered.

An object of the present invention is to provide a method for filling in missing attribute values that is practical, efficient, and general enough to be used on very large data sets.

Another object of the present invention is to increase the accuracy of prior art missing value methods.

Yet another object of the present invention is to provide a nonparametric method for filling in missing values which minimizes the number of statistical assumptions necessary.

Another object of the present invention is to provide a method for filling in missing values which is applicable to a wide range of data set applications and suffering from a wide variety of problems.

Another object of the present invention is to provide a KNN method for filling in missing values which iterates to achieve better approximations.

Additional features and advantages of the present invention will be set forth in the description which follows, and in part will be apparent from the description, or may be learned by practice of the invention. The objectives and other advantages of the invention will be realized and attained by the process particularly pointed out in the written description and claims hereof as well as the appended drawings.

To achieve these and other advantages and in accordance with the purpose of the present invention, as embodied and broadly described, in accordance with a first aspect of the present invention there is provided a method for filling in missing attribute values in a data set array of cases and attribute positions includes the steps of, for a first case which includes an empty attribute position, determining a first set of K nearest neighbor cases which have known values for the corresponding attribute position as the empty attribute position in the first case; determining a filled in attribute value from the first set of K nearest neighbor cases for the empty attribute position of the first case; determining a second set of K nearest neighbor cases to the first case which have known values for the corresponding attribute position as the empty attribute to position in the first case; and revising the filled in attribute value of the first case with an attribute value determined from the second set of K nearest neighbor cases.

In another aspect of the present invention, an article of manufacture includes a computer usable medium having computer readable program code means embodied therein for filling in missing attribute values in a data set array of cases and attribute positions, the computer readable program code means in said article of manufacture including computer readable program code means for causing a computer to effect, for a first case which includes an empty attribute position, a determination of a first set of K nearest neighbor cases which have known values for the corresponding attribute position as the empty attribute position in the first case; computer readable program code means for causing the computer to determine a filled in attribute value from the first set of K nearest neighbor cases for the empty attribute position in the first case; computer readable program code means for causing the computer to determine a second set of K nearest neighbor cases to the first case which have known values for the corresponding attribute position as the empty attribute position in the first case; and computer readable program code means for causing the computer to revise the filled-in attribute value of the first case with an attribute value determined from the second set of K nearest neighbor cases.

In a further aspect of the present invention, a computer system for filling in missing attribute values in a data set array of cases and attribute positions includes, for a first case which includes an empty attribute position, means for determining a first set of K nearest neighbor cases which have known values for the corresponding attribute position as the empty attribute position in the first case; means for determining a filled in attribute value from the first set of K nearest neighbor cases for the empty attribute position of the first case; means for determining a second set of K nearest neighbor cases to the first case which have known values for the corresponding attribute position as the empty attribute position in the first case; and means for revising the filled in attribute value of the first case with an attribute value determined from the second set of K nearest neighbor cases.

It is to be understood that both the foregoing general description and the following detailed description are exemplary and explanatory and are intended to provide further explanation of the inventions as claimed.

BRIEF DESCRIPTION OF THE DRAWINGS

The accompanying drawings, which are included to provide a further understanding of the invention and are incorporated in and constitute a part of this specification, illustrate embodiments of the invention that together with the description serve to explain the principles of the invention.

In the drawings:

FIG. 1 illustrates an example of an attribute listing for a particular case in a consumer loan database;

FIG. 2 illustrates a data set array example having nine cases and five attribute values for each case;

FIG. 3 illustrates a data set array example having a missing attribute value in the first of the nine cases;

FIG. 4 illustrates a data set array example having a filled in attribute value in the first of the nine cases;

FIG. 7a illustrates a data set array example having filled in attribute values after a first iteration;

FIG. 7b is a data set array having original attribute values;

FIG. 8a illustrates a data set array example having filled in attribute values after a second iteration of the missing value estimation;

FIG. 8b is a data set array having filled-in attribute values after a first iteration;

FIG. 9a illustrates a data set array example having filled in attribute values after a third iteration of the missing value estimation;

FIG. 9b is a data set array having original attribute values;

DETAILED DESCRIPTION OF THE PREFERRED EMBODIMENTS

Figure 5:
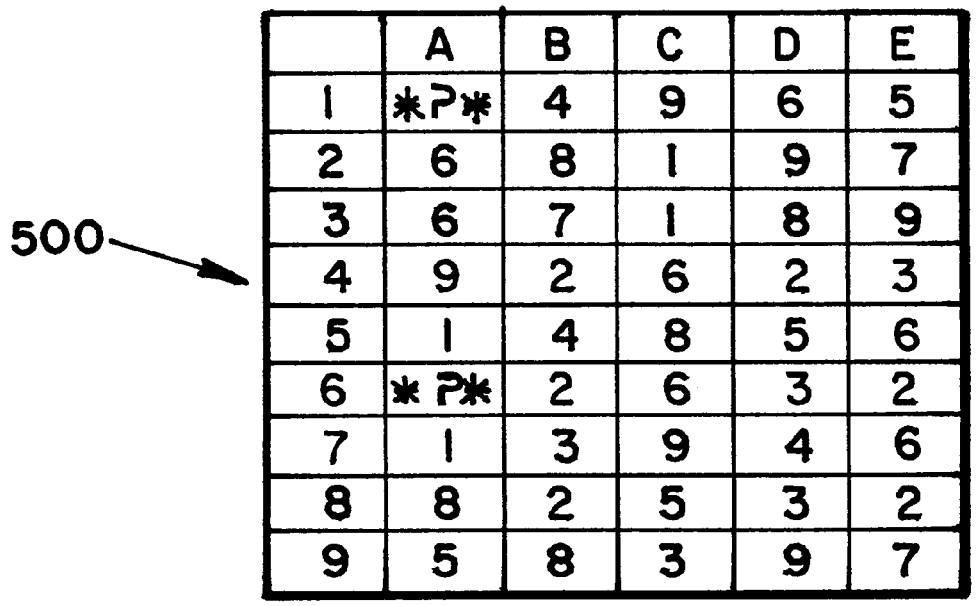
FIG. 5 illustrates a data set array example having missing attribute values in the first and sixth of the nine cases.

Reference will now be made in detail to the preferred embodiments of the present invention, examples of which are illustrated in the accompanying drawings.

The preferred embodiment of the present invention involves a method for filling in missing values, and more particularly, to filling in missing attribute values in a data set array of cases and attribute positions. A case generally corresponds to a set of entries in a data set, and more specifically corresponds to a record related to some entity or object in which the data set user is interested. For example, a case might correspond to a customer in a consumer data set, a transaction in a banking data set, a patient in a medical data set, or a web page in an information retrieval data set. An attribute is a particular measurement which represents an aspect of a particular case, and typically corresponds to a single entry in the case. For example, FIG. 1 illustrates an example of an attribute listing for a particular case in a consumer loan data set.

Each case is represented as a set of attributes with values. Most of the values are known, but sometimes, however, the value of an attribute may be initially missing. For example, as shown by the example of FIG. 1, the age and highest educational degree earned for John Smith may be initially missing in a case. The goal of this invention is to efficiently and accurately estimate missing values such as these.

As can be seen, the case shown in FIG. 1 corresponds to a person named "John Smith," and includes a variety of attributes to correspond to John Smith (such as name, Social Security No., age, annual income, time at current job, total debt, number of prior loan defaults, marital status, highest educational degree, and home ownership status). Each attribute 100, shown in FIG. 1, preferably includes an identifier 102 and a value 104. Of course, the actual data set need only store the values 104, provided that each identifier 102 is known.

Of course, there is no theoretical limit to the number of cases in the data set, or in the number of attributes each case can have. In practice, if the number of attributes is very large, the algorithm will become slower because it must process all the attributes, and the accuracy of the filled-in values may degrade. A large number of cases will generally improve the accuracy of the filled in values.

A "legal value" is a value for an attribute in a case that is acceptable in the data set. For example, legal values for the home_owner attribute might be "yes," "no," and "missing." However, in a different data set the legal values for the home_owner attribute might be "0" meaning no home owned, "1" meaning one home owned, "2" meaning two homes owned, and "–1" indicating that a value is missing. One of the main problems when filling-in missing values with prior art arrangements is that many systems will predict missing values that fall between the values in the data set, and thus be illegal. For example, many missing value systems might predict the value of the home_owner attribute to be "1.279889" because the case seems to be most similar to other cases that own 1 or 2 homes. But "1.279889"may not be a legal value in this data set for this attribute.

To avoid this, the present invention uses a K-Nearest Neighbor ("KNN") method for filling in missing attribute values which avoids the interpolation problems of the prior art. Using KNN insures that the value filled-in is one of the values already in the database for this attribute. Thus, the filled-in value for the home_owner attribute would have to be one of the integers already in the database such as "0, " "1, " or "2" and predictions between these values would not occur. This makes the algorithm very easy to apply to large database without the need to understand, or consider the proper legal values for each individual attribute.

FIG. 2 illustrates a data set array example 200 of the instant invention having nine cases (numbered 1–9) and five attributes (A, B, C, D and E) for each case. FIG. 2 represents a complete data set with no missing values. From this data set table, for example, case 1 has a value 2 for attribute A.

Now suppose the value of attribute A for case 1 had been missing and its true value of 2 was unknown. Further, suppose there are no other missing values. FIG. 3 illustrates such a table 300 where "?" means that the attribute value is initially missing. The following description will refer to these initially missing attributes as "unknown," even after the program of the instant invention has filled in estimated values for them. Further, the following description will refer to attribute values that do not yet have an estimate filled in as "missing." It should be understood that the present invention, in its broader aspects, generally considers the KNN method with K greater than or equal to 1. Although the several following exemplary illustrations implement a K=1 embodiment, the present invention can be extended to an implementation with K greater than on in those examples.

In accordance with a first preferred embodiment of the present invention, a value can be filled-in for attribute A of case 1 by finding which of the other cases (numbered 2–9) in the data set is most similar to case 1 with regard to each of its other attribute values (B, C, D, and E), and using attribute A of this most similar case as the missing attribute A value of case 1. Preferably, this similarity may be determined through the use of a distance metric that measures how close or similar each remaining case in the data set is to case 1. A simple distance metric, for example, is the Euclidean distance, the square root of the sum of the squared distances along each attribute. The Euclidean distance metric will be used in the following examples for purposes of explanation. The distance between case 1 and case 2 in FIG. 3, for example, is:

$$\text{SQUARE\_ROOT } ((4-8)^2+(9-1)^2+(6-9)^2+(5-7)^2)=9.64365$$

Note that attribute A was not used when computing the distance because of the inability to compute the term $(?-6)^2$ in view of the fact that case 1 is missing the value for that attribute in FIG. 3.

The distance between case 1 and all the other eight cases is determined this same way. In the example shown in FIG. 2, the closest case to case 1 (the case with the smallest distance metric) is case 5 which has distance of 1.73205. In the first preferred embodiment of the present invention, the K=1 nearest neighbor method is being applied, and thus the value of the attribute from the single nearest case is utilized to fill-in the missing value. The value of attribute A from case 5 (the nearest neighbor to case 1) is thus copied and placed in the case missing that value. This gives case 1 the new value "1" for attribute A. Note that the correct value for attribute A for case 1 was "2," but the foregoing method has estimated the value to be "1." While filled-in values are often not perfect, a value of "1" is a reasonable estimate for attribute A on case 1. The new table 400 with the value filled-in is shown in FIG. 4.

Turning now to a second example, it is possible that the database array will have more than one missing value. For example, FIG. 5 illustrates a database array example 500 which is missing the values for attribute A in both case 1 and case 6. Because both of the missing values here are in the column for attribute A, which we did not use in the distance computation, it is possible to utilize the method just described to fill in the missing values of these two cases. The distances between case 1 and case 6, respectively, and each of the remaining cases (2,3,4,5,7,8,9) is computed by finding their respective nearest neighbors, and copying that neighbor's value for attribute A into case 1 and 6 respectively. Of course, the distance between cases 1 and 6 is not computed because even if they were each other's nearest neighbor, neither of these cases would provide a value for filling-in the missing attribute since they are both missing it. Thus, the preferred embodiment only compares cases which do not have the same attribute missing.

Figure 6:
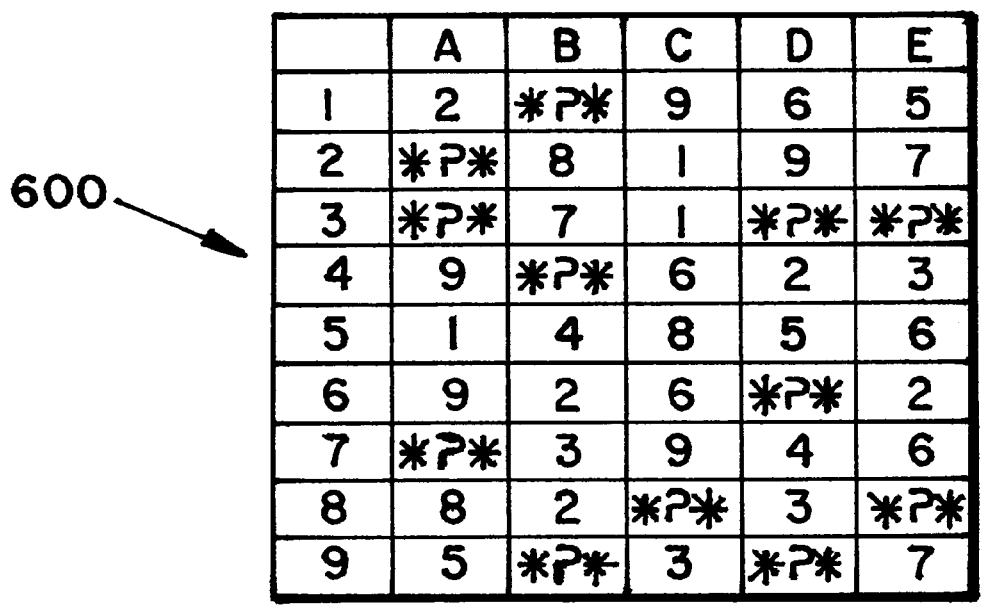
FIG. 6 illustrates a data set array example having missing attribute values throughout the data set array.

Now suppose missing values are peppered throughout the database as shown in FIG. 6. This database array 600 has 12 missing values. Furthermore, each attribute has a missing value for at least one case. As will be appreciated, the foregoing method cannot be applied to database array 600 to fill in the missing values because that method is not adapted to compute the distance between cases when cases are missing attribute values from other columns than the missing attribute value presently being determined. For example, in an attempt to compute the distance between case 1 and case 2 in FIG. 6 to fill in the value of attribute B on case 1, the following distance formula results:

$$\text{SQUARE\_ROOT } ((2-?)^2+(9-1)^2+(6-9)^2+(5-7)^2)=?????$$

The first term "$(2-?)^2$" cannot at this point be computed because case 2 is missing a value for attribute A. As a result, we must estimate the value of "?" in this term. The average value for attribute A from the remaining cases of the data set which have a known value for attribute A is 5.6666 in this particular example. Thus, the 5.6666 value is utilized as an estimate for the value of attribute A for cases missing this value. It should be understood that it preferably does not matter whether this intermediate average value satisfies the criteria for legal attributes. As explained below, this intermediate average value is used in subsequent steps and the ultimate result will replace the missing attribute with a legal value. Moreover, while this particular averaging method is described in connection with this embodiment, it is emphasized that the instant invention in its broader aspects is not limited to this presently preferred method, and that other methods of finding an initial estimate of the filled-in value for missing attributes can also be used with this invention.

Using the mean value for an attribute when it is missing allows the computation of the distance between cases to find the nearest neighbor. Note that in the preferred procedure of filling-in the missing value for attribute B in case 1, attribute B is not utilized in the distance calculation and thus it is not necessary to fill-in missing values for attribute B in cases 1, 4, or 9. Moreover, it is not necessary to compute the distance from case 1 to case 4 or case 9 because cases 4 and 9 are missing values for attribute B and thus couldn't provide a value for attribute B even if they were case 1's closest neighbor. Generally, when filling-in attribute X, the preferred method of the present invention considers neighbors that were never missing the value of attribute X.

Computing distances this way, the closest neighbor to case 1 that is not missing attribute B when computing distance using attributes A, C, D, and E is determined to be case 5, which has a value 4 for attribute B. Thus, attribute B on case 1 is filled-in with the value of 4. This procedure is followed for each of the other missing values in the database. In one preferred embodiment of the instant invention, the value of 4 for case 1, attribute B is now available to be utilized when computing subsequent distances between case 1 and other cases. In an alternate preferred embodiment, this filled-in value may be temporarily ignored and not used in subsequent calculations before all missing values have been filled in during the first pass. This alternate preferred embodiment results in increased accuracy and stability in the filling in process at the minimal expense of requiring an extra iteration.

There is one subtlety in using attribute mean values as initial estimates when they are missing. Suppose that the two cases between which the distance is presently being determined are both missing the same attribute. If the missing value on each case is filled-in with the mean value of that attribute and then compute the distance, both cases will have the same filled-in value for that attribute and will thus have zero distance along this attribute. In other words, the term "$(?-?)^2$" becomes "$(\text{mean}-\text{mean})^2$" which is $(0)^2$ which is 0. Such a result skews the outcome because the mere fact that two cases are missing the same attribute does not necessarily mean that have the same value for that attribute. To solve this particular problem, a preferred embodiment of the estimation method of the instant invention computes the average difference along each attribute for cases in the database not missing that attribute, and then utilizes this average difference result for the "(?−?)" term when computing distances.

As an example, suppose attribute A in case 3 is being filled-in. This procedure requires the computation of the distance from case 3 to case 6. However, case 3 and case 6 are both missing attribute D. Rather than use "(?−?)"="0" for the term for attribute D, the average difference between D for cases in the database not missing it is utilized. The average difference is 3.0000. This average difference between attribute values is computed by considering all pairs of cases not missing that attribute and computing the average of this difference for each pair. There will be a number of pairs equal to the square of the number of cases not missing the attribute value. As a result, the difference of 3.0000 is substituted for the "(?−?)" term on attribute D, and the calculation computed.

In very large data sets where such a computation may be too costly, another variation is to compute the average by randomly sampling pairs of cases from the data set. Because the average is used only as an initial estimate that will be refined by algorithm, it is not vital that this estimate be extremely reliable. As a result, small samples will suffice.

The foregoing process is utilized to find the nearest neighbor (not missing the attribute of interest) to the case that is missing the attribute of interest. Copying the attribute value of that nearest neighbor into the case missing the attribute fills in the value. This is performed for all attributes in all cases in the data set that are missing, yielding a new data set with all missing values filled in. The data set now comprises a complete data set of original, known values and newly calculated filled in values, and has no missing values. Each filled in value is marked, however, in order to distinguish between the original known values in the data set and those that have been filled in. Doing this for the data set above yields the filled in data set 700 shown in FIG. 7a. Data set 700 includes asterisks surrounding the filled in values.

To evaluate the result of this exemplary method, we compare the filled in values with the true values in the original data set. For convenience, the original table 200 is shown again in FIG. 7b under the filled in table 700 of FIG. 7a. A comparison between FIGS. 7a and 7b indicates that five of the filled-in values are exactly correct. For example, attribute B on case 1 was filled in with a value 4. Another five of the filled in values are close to the correct value. For example, attribute A on case 2 was filled in with a 5 but the correct value is 6. Two of the filled in values are substantially wrong. For example, attribute B in case 9 has been filled in with a value of 2, but the correct value is 8. Attribute C in case 8 has also not been replaced with the correct original value of 9.

As can be seen, reasonable estimates of the values of all the missing values have now been determined. Nevertheless, these estimates may now be utilized to better compute the distances between neighbors. Increased accuracy in the computation of the distances between neighbors allows increased accuracy in the determination of nearest neighbors which in turn results in increased accuracy in the ultimately filled in values. In view of this, the KNN method is applied for a second iteration to the aforementioned filled in data set to revise all of the filled in values of filled in Table 700. As before, this KNN iteration is applied to each attribute that originally had a missing value in each case. Preferably, it is only necessary to examine neighbors when filling in attribute X that were never missing the value of attribute X, as noted above. Filling in the data set with a value that itself was filled in could adversely affect system stability and be less preferable. It is noted that during this, and subsequent, iterations of KNN and filling in, the foregoing so-called "bootstrapping" rules that were used to handle terms like "(?−5)$^2$" or "(?−?)" are no longer required because estimated values have already been obtained for each of the question marks representing missing values.

Performing a second iteration of the preferred algorithm to revise the filled in table 700 yields a new filled in table 800 as shown in FIG. 8a. Below this table, in FIG. 8b, the previous filled in table 700 of FIG. 7a is repeated for ease of comparison, which shows that eight of the filled in values have remained unchanged. Moreover, four of the filled in values have been revised, including the two filled in values that had the most error in the previous iteration (attribute B, case 9 and attribute C, case 8). These now have better, more accurate filled in values. But attribute D on case 9, which used to be filled in with the exact value, now has a less accurate value. Generally, the new table has more accurate filled in values, but not every filled in value is more accurate than it was on the previous iteration.

This process of revising the filled in table by re-filling in missing values is iterated using the estimated filled in values from the previous iteration yields improved filled-in values with each iteration. As the iteration continues, this process may converge to a set of stable filled in values that does not change, or it may continue to cycle between different sets of filled in values. If the processes ends up cycling between different sets of filled in values the algorithm may be halted by examining how much the filled in attributes change on each iteration. When the average change from one iteration to the next becomes small, it is an appropriate time to stop the application of the algorithm. As noted above, however, often the algorithm will converge and the average change between filled in values becomes zero.

One more iteration of revising the filled-in values yields the filled-in table 900 shown in FIG. 9a. For convenience in comparison, the original table of FIG. 2 is shown below FIG. 9a as FIG. 9b. Only one filled-in value has changed since the previous iteration table 800 (shown in FIG. 8a). Attribute D in case 9 has switched from a value of 5 in the previous iteration to a value of 9 in the current iteration, which is the correct value. Further iterations do not change the filled-in values, though on larger, more complex data sets it can take many iterations before filled-in values stabilize or converge.

As can be seen, the final filled-in values are quite accurate. Five of the filled-in values are exactly correct. Six of the seven remaining filled-in values are off by 1. Only one filled-in value is off by more than 1. Attribute E on case 3 has been filled-in with a value of 7, but the correct value is 9, for a difference of 2. Overall, this result represents very good performance.

As described above, the first preferred embodiment of the present invention involves the use of a K Nearest Neighbor (KNN) algorithm with K=1 to fill in missing attribute values in a data set array. In general, in that embodiment, the other case in the data set that most closely resembles the case with the attribute value to be filled in, considering only those remaining cases that have a known value for the attribute to be filled in. This other case is referred to as the "nearest neighbor" case. The attribute value from the nearest neighbor case which corresponds to the attribute position to be filled in is then used as the new estimate for the unknown attribute value to be filled in. This procedure is continued until the entire data set has been scanned and a new estimate has been created for every unknown attribute value in the data set. This entire procedure is repeated until either there is no further change or until a fixed limit on the number of iterations has been reached. It has been determined that there is often an advantage in iterating this procedure more than once. The estimated values filled in during the first pass may alter the nearest neighbor choices during the second pass. This, in turn, may change some of the estimated values. Normally, only a small number of iterations, fewer than ten for example, are needed.

A second preferred embodiment of the present invention involves the use of a K Nearest Neighbor (KNN) algorithm with K greater than 1 to fill in missing attribute values in a data set array. In this embodiment is similar to the first preferred embodiment discussed above, but differs in that a set of the K closest neighbor cases to the case with the value to be filled in is determined. As in the previous embodiment, only cases that have known values for the attribute corresponding to the position to be filled in are considered. The new filled in attribute value is then computed based on the corresponding attribute values for each of the K nearest neighbor cases.

There are a variety of available ways to calculate the filled in estimate value from the corresponding attribute values in the K nearest neighbor cases. For example, the filled in value may be the value most common among the K closest neighbors, i.e., the median value of the neighbors. If none of the K neighbors have the same value, then the value of the nearest neighbor may be used, as with the K=1 nearest neighbor approach of the first preferred embodiment of the present invention. Alternatively, if the value to be filled in is a continuous-valued attribute, a preferred implementation is to use the average of the corresponding attribute values of the K nearest neighbor set as the new estimate. It is also possible to compute a weighted average so that closer neighbors in the set have greater influence on the filled in value than neighbors that are further away.

If the value to be filled in is allowed to take on only a few possible values, such as (0, 1) or (red, blue, green), a second preferred implementation is to allow each of the K neighbors to vote for their own value to be filled in, and to select the value that receives the most votes. In the event of a tie, the value whose supporting cases have the smallest total distance from the case having the value to be filled in is chosen.

This second preferred embodiment of the present invention which utilizes KNN with K>1 is useful because it reduces the influence of any one case on all of the other cases. This is important if the data set contains some erroneous or inaccurate cases or similar forms of "noise."

The first and second preferred embodiments discussed above involve a calculation to to determine one or more nearest neighbors to a given case. This is done by computing the distance between the case including the unknown attribute value and every other respective case in the data set that has a known value for the attribute corresponding to the unknown attribute value. The nearest neighbors are determined by choosing the case or cases whose distance is smallest.

A number of different distance measures are in common use. The preferred implementation utilizes the Euclidean distance which has been discussed in the foregoing description. For attributes whose values are not numerical, for example if the allowed values are (red, blue, green), we assign a distance of 0 if the attribute is the same as the value of the case to be filled in, and we arbitrarily assign a positive distance (such as 100) if the value is different.

Figure 10:
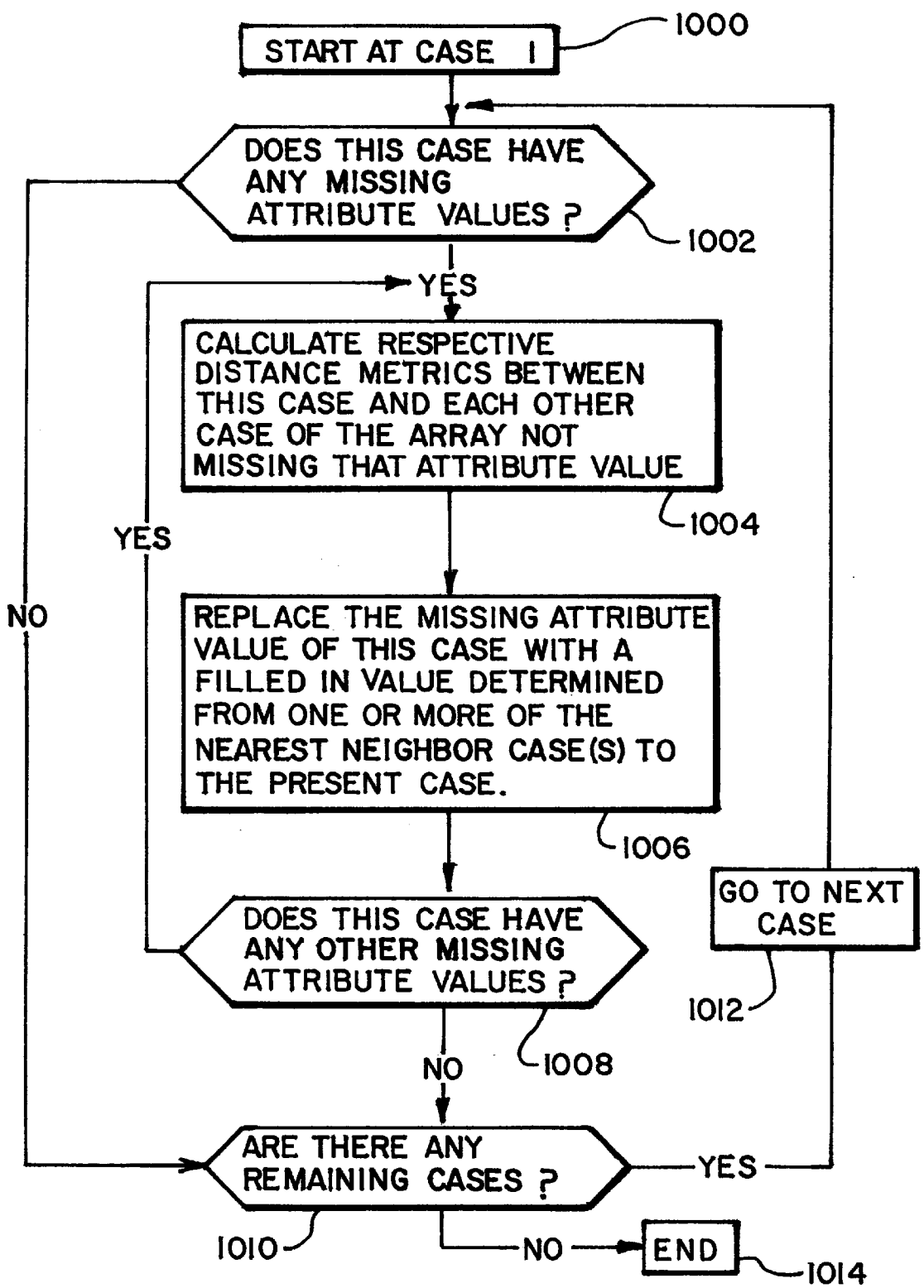
FIG. 10 is a flow diagram of the steps involved in the method for filling in missing attribute values in a data set array of cases and attribute positions of a preferred embodiment of the present invention.

FIG. 10 is a flow diagram of the steps involved in the method for performance a single iteration of filling-in missing attribute values in a data set array of cases and attribute positions of the present invention. As indicated by block 1000, the process begins at the first case of the array. A determination is made in block 1002 of whether this first case has any missing attribute values. If so, the process flow described below with respect to case 2 will be followed. If not, the process flow moves to block 1010 where a determination is made of whether there are any remaining cases in the array. If there are no more cases in the array, this particular iteration is complete, as indicated by block 1014. If there are remaining cases in the array, the process flow goes to block 1012, which increments the determination to the beginning of the next case in the array. Once at the next case, a determination is made at block 1002 of whether case 2 has any missing attribute values. If not, the aforementioned process flow applies.

If the determination at block 1002 is that the present case has missing attribute values, then respective distance metrics are calculated, at block 1004, between this present case and each other case of the array which is not missing that attribute value. Once each of these distance metric values are obtained, the flow moves to block 1006 where the missing attribute value of the present case is replaced with a filled in value determined from a set of K nearest neighbor cases to the present case. Once this has been done, the flow moves to block 1008, where a determination is made whether this present case has any other missing attribute values. If so, the flow goes back to block 1004 and the process of blocks 1004 to 1008 is repeated for each remaining missing attribute value in that present case. If that present case does not have any other missing attribute values, the process flow moves to block 1010 described above, which determines whether the array includes any remaining cases. If so, the flow moves to block 1012, which increments the determination to the beginning of the next case in the array. If there are no remaining cases in the array, the flow moves to block 1014 which indicates that this particular iteration is complete.

During the first iteration of the algorithm, there has not yet been computed an estimate for some of the unknown values. As a result, the three "bootstrapping" rules discussed above with regard to the first preferred embodiment of the present invention may also be applied to the second preferred embodiment.

Figure 11:
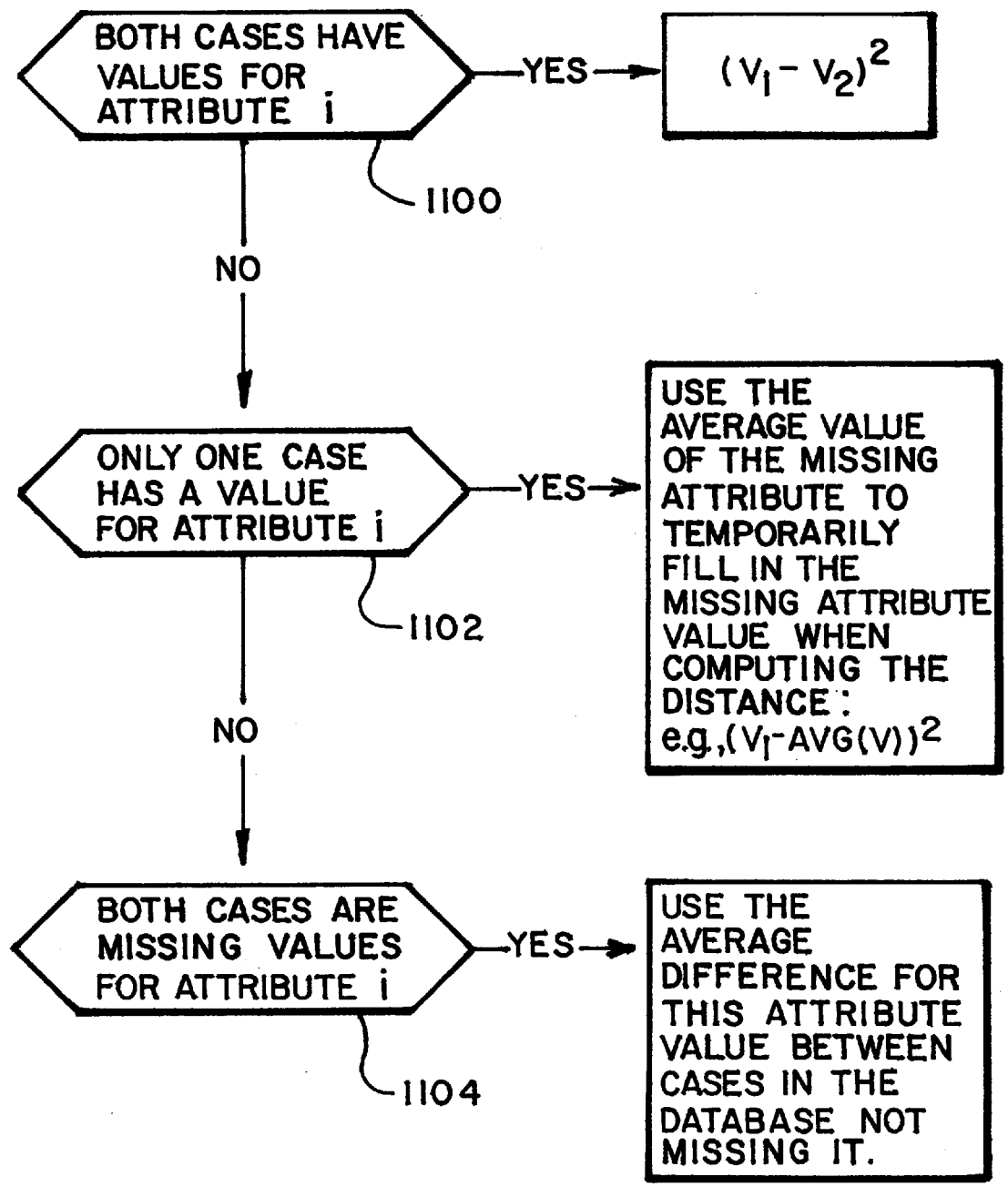
FIG. 11 is a flow diagram of the steps involved in the method for calculating the distances along each attribute within the distance metric determination of a preferred embodiment of the present invention.

FIG. 11 is a flow diagram of the bootstrapping rules involved in the method for calculating the distances along each attribute within the distance metric determination of the first and second preferred embodiments of the present invention. Blocks 1100 to 1104 make respective determinations of whether the two cases presently being considered in the distance calculation have attribute values in the particular attribute column of the array for the term of the distance metric equation presently being calculated. If block 1100 determines that both values are in the table for that particular attribute, their difference is taken and squared and used as that particular term in the distance metric equation. If both attribute values are not in the table, the process flow moves to block 1102, where a determination is made of whether only one of the two cases has a value for that particular attribute. If so, the average value of the missing attribute, determined from the other cases in the array which include a known value for that attribute, is substituted for the missing attribute value in the present term of the distance metric equation being calculated. The difference between the substituted value and the value already in the table is then squared and used as that particular term in the distance metric equation.

Finally, if it is determined that both of the cases presently being analyzed in the distance calculation are missing, then the process flow will have moved to block 1104 and the average difference for this particular attribute value between cases in the entire data set not missing it will be determined. This average difference will then be squared and used as that particular term in the distance metric equation.

As indicated by the foregoing description and as shown in the drawings, the present invention results in a method for filling in missing values in a data set that is practical and general, and yet efficient enough to be used even on very large databases. Moreover, this arrangement provides a nonparametric method which thus makes a minimum number of statistical assumptions and provides significant improvement over the accuracy of prior art missing value methods. Finally, this arrangement provides a method for filling in missing values which is applicable to a wide range of database applications and problems.

Figure 12:
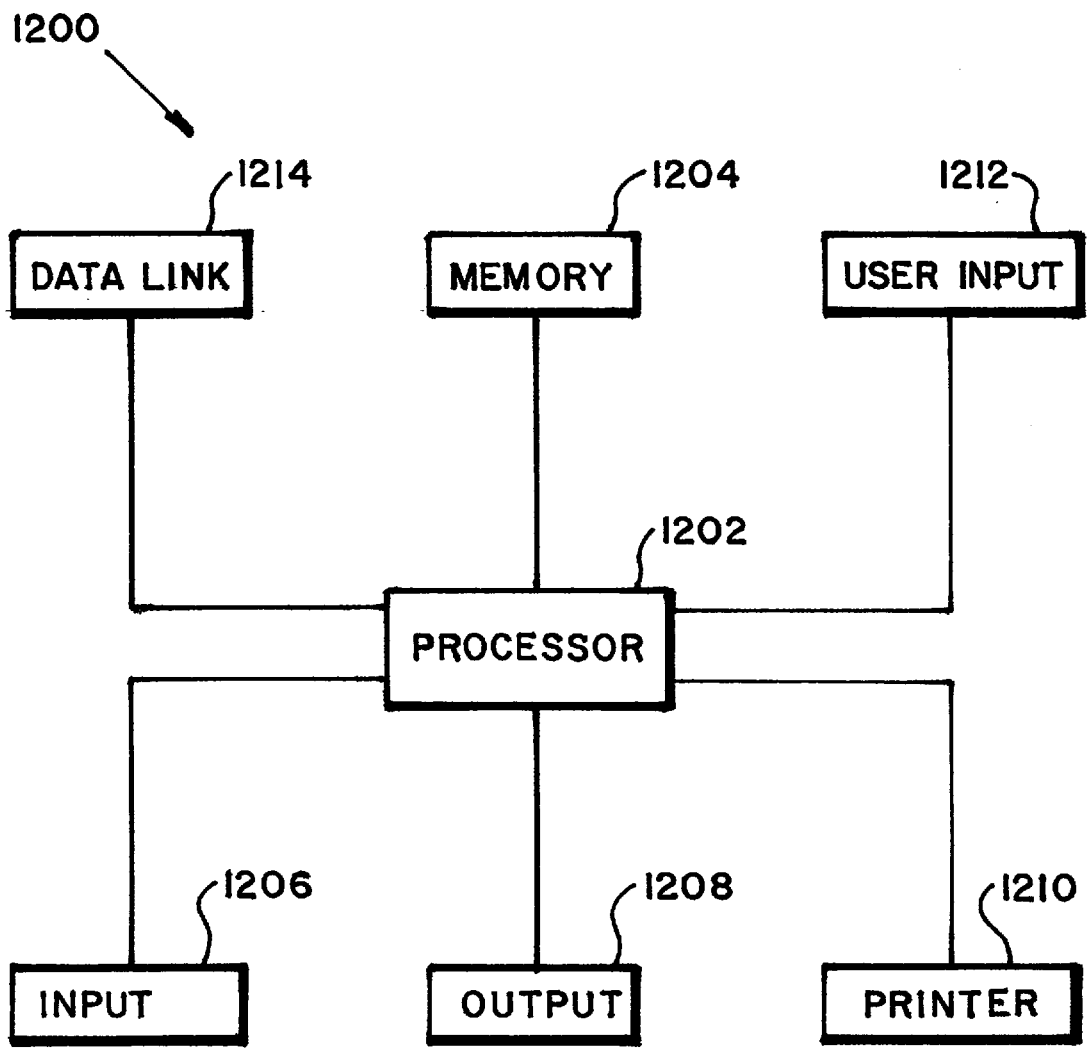
FIG. 12 is a block diagram of a computer system according to an embodiment of the present invention.

FIG. 12 shows an example of a computer system 1200 for running the method of the instant invention. In particular, a processor 1202 performs the processing functions of the computer system 1200 and is shown connected to a variety of devices in FIG. 12. A memory 1204 is shown connected to the processor 1202, and is used to store various data generated by the processor during the implementation of the various features of the present invention. For example, the case and attribute data may be stored in memory 1204. Also, appropriate software for implementing the desired operation (for example, calculating respective distance metrics) of the computer system 1200 is preferably stored in the memory 1204. Other attached peripherals may include an input device 1206, an output device 1208, such as a monitor, a user input device (such as a keyboard, for example) 1212, a printer 1210 and a data link 1214 to a network, for example. Of course, it should be understood that the computer system of FIG. 12 is merely an example of a rudimentary hardware configuration which may be used to implement the preferred methods according to the present invention. Other appropriate hardware configurations may be considered.

The above-described method was implemented using the C programming language, run on a computer with appropriate functionality, and tested on a medical domain database. After five to twenty iterations, the filled-in values stabilized. Table I below shows the empirical results of the average variation as the missing value prediction is iterated. The column labeled "Mean" shows that the missing values converge because the change in missing values tends to get smaller as the iterations proceed. The data in Table 1 results from 10 trials and shows the average change in filled in values using KNN from one iteration to the next for ten iterations. Iteration 0 is the average change in the filled in values computed using the three bootstrap rules described description and indicated by the flowchart of FIG. 11.

TABLE I

| Iteration | N | Mean | SD | Min | Max |
| --- | --- | --- | --- | --- | --- |
| 0 | 10 | 0.5595 | 0.0130 | 0.5379 | 0.5812 |
| 1 | 10 | 0.1242 | 0.0206 | 0.0969 | 0.1572 |
| 2 | 10 | 0.0628 | 0.0158 | 0.0415 | 0.0804 |
| 3 | 10 | 0.0411 | 0.0127 | 0.0238 | 0.0580 |

TABLE I-continued

| Iteration | N | Mean | SD | Min | Max |
| --- | --- | --- | --- | --- | --- |
| 4 | 10 | 0.0302 | 0.0108 | 0.0156 | 0.0460 |
| 5 | 10 | 0.0232 | 0.0094 | 0.0103 | 0.0372 |
| 6 | 10 | 0.0202 | 0.0085 | 0.0078 | 0.0325 |
| 7 | 10 | 0.0187 | 0.0084 | 0.0063 | 0.0303 |
| 8 | 10 | 0.0187 | 0.0087 | 0.0053 | 0.0306 |
| 9 | 10 | 0.0177 | 0.0083 | 0.0049 | 0.0289 |

Table II below shows the average empirical results of ten trials missing values prediction on a medical prediction problem. The values in the column labeled "Mean" are the accuracy of the predictions made with the filled in data set as a function of the number of iterations of filling in. This column shows that the missing values make better predictions than in the previous example. The database is, of course, more useful as it gets more accurate. Predictions on this problem are made using kernel regression on the filled in data set. The accuracy at iteration 0 is the accuracy that kernal regression achieves when distance is computed using just the three bootstrap rules described by the foregoing description and indicated by the flowchart of FIG. 11. As the table shows, accuracy improves from 69.53% to 74.53% after 10 iterations of filling in.

TABLE II

| Iteration | N | Mean | SD | Min | Max |
| --- | --- | --- | --- | --- | --- |
| 0 | 10 | 0.6953 | 0.0110 | 0.6732 | 0.7113 |
| 1 | 10 | 0.7398 | 0.0132 | 0.7060 | 0.7520 |
| 2 | 10 | 0.7421 | 0.0174 | 0.7021 | 0.7625 |
| 3 | 10 | 0.7429 | 0.0166 | 0.7087 | 0.7598 |
| 4 | 10 | 0.7430 | 0.0162 | 0.7073 | 0.7612 |
| 5 | 10 | 0.7445 | 0.0168 | 0.7087 | 0.7651 |
| 6 | 10 | 0.7451 | 0.0175 | 0.7060 | 0.7677 |
| 7 | 10 | 0.7455 | 0.0178 | 0.7060 | 0.7677 |
| 8 | 10 | 0.7444 | 0.0177 | 0.7060 | 0.7677 |
| 9 | 10 | 0.7450 | 0.0176 | 0.0760 | 0.7664 |
| 10 | 10 | 0.7453 | 0.0174 | 0.7073 | 0.7664 |

Finally, attached hereto before the claims is a preferred implementation of the software code embodying an example of the present invention.

The use of the term "nearest neighbor" in the foregoing description refers to another case in the data set which most closely resembles the present case having an unknown value to be filled in, considering the remaining attribute values. This has nothing to do, for example, with "neighboring" pixels in an image or nearby houses in a real-estate database.

While the invention has been described in detail and with reference to specific embodiments thereof, it will be apparent to one skilled in the art that various changes and modifications can be made therein without departing from the spirit and scope thereof. Thus, it is intended that the present invention cover the modifications and variations of this invention provided they come within the scope of the appended claims and their equivalents.

```
#include <stdio.h>
#include <stdlib.h>
#include <math.h>
#define NO_PATS 2287
#define NO_COLS 216
#define NO_FEATS 201
```

-continued

```
#define KERNEL_WIDTH 100.0 /* mean distance = 462. sdev = 201. min = 83, max = 2952 */
#define KNN 1
#define MAX_LOOPS 5
#define epsilon +1.0e-10
#define VERBOSITY 0
int feats[NO_FEATS] =
{7, 8, 9, 10, 11, 12, 13, 14, 15, 16, 20, 21, 22, 23, 24, 25, 26, 27, 28, 29, 30, 31, 32, 33, 34, 35, 36, 37, 38, 39, 40, 41, 42, 43, 44,
45, 46, 47, 48, 49, 50,51, 52, 53, 54, 55, 56, 57, 58, 59, 60, 61, 62, 63, 64, 65, 66, 67, 68, 69, 70, 71, 72, 73, 74, 75, 76, 77, 78, 79,
80, 81, 82, 83, 84, 85, 86, 87, 88, 89, 90, 91, 92, 93, 94, 95, 96, 97, 98, 99, 100, 101, 102, 103, 104, 105, 106, 107, 108, 109,
110, 111, 112, 113, 114, 115, 116, 117, 118, 119, 120, 121, 122, 123, 124, 125, 126, 127, 128, 129, 130, 131, 132, 133, 134,
135, 136, 137, 138, 139, 140, 141, 142, 143, 144, 145, 146, 147, 148, 149, 150, 151, 152, 153, 154, 155, 156, 157, 158, 159,
160, 161, 162, 163, 164, 165, 166, 167, 168, 169, 170, 171, 172, 173, 174, 175, 176, 177, 178, 179, 180, 181, 182, 183, 184,
185, 186, 187, 188, 189, 190, 191, 192, 193, 194, 195, 196, 197, 198, 199, 200, 201, 202, 203, 204, 205, 206, 207, 208,
209, 210, 212[;
#define NO_KNNS 20
int knn_list∂NO_KNNS] = {1, 3, 5, 7, 9, 11, 21, 31, 41, 51, 61, 71, 81, 91, 101, 201, 301, 401, 501, 750};
int knn_loop
double pats[4][NO_PATS][NO_COLS]; /* pats[0]. . . =preprocessed; pats[1]. . . = postprocessed */ int pat,
col. feat;
double sum[NO_COLS]. sumsq[NO_COLS], mean[NO_COLS], sdev[NO_COLS], fmissing[NO_COLS],
min[NO_COLS], max[NO_COLS]:
int missing[NO_COLS], notmissing[NO_COLS]:
double mean_pre[NO_COLS], sdev_pre[NO_COLS]:
int pat1, pat2, difnotmissing[NO_COLS];
double difsum[NO_COLS], difmean[NO_COLS];
double vtest, vtrain: double distance, distance_weight, vote_sum, vote_distance_sum, prediction_krr; int
feat_tr, col_tr, test, train:
double motion, motion_sum;
int motion_count;
double closest_distance;
int closest_pat;
double prediction_knn;
double result2[NO_PATS];
int result1[NO_PATS]:
int knn. k. neighbor:
int err_krr, cor_krr, err_knn[NO_KNNS], cor_knn[NO_KNNS];
int loop, i,
int max_loops, no_pats, kr_knn:
double kernel_width:
int partition (p.r)
     int p.r.
{
int i, j, tempi;
double x, tempf;
x = result2[p];
i = p - 1;
j = r + 1;
while (1)
     {
        do j--; while (!(result2[j] <= x));
        do i++; while (!(result2[i] >= x));
        if (i < j)
           {
           tempf = result2[i];
           result2[i] = result2[j];
           result2[j] = tempf;
           tempi = result1[i];
           result1[i] = result1[j];
           result[j] = tempi;
           }
        else
        return(j);
     }
}
quicksort (p.r)
     int p.r.
{
int q;
if (p < r)
     {
        q = partition (p.r);
        quicksort (p.q);
        quicksort (q+1.r):
     }
}
void predict_care (int loop)
{
col = 2-1; /* now let's predict CARE (inpatient/outpatient) */
err_krr = 0;
```

-continued

```
cor_krr = 0;
for (knn_loop=0; knn_loop<NO_KNNS: knn_loop++)
    {
        err_knn[knn_loop] = 0;
        cor_knn[knn_loop] = 0;
    }
for (test=0; test<no_pats; test++)
    if(pats[0][test][col] > -9)
    {
    neighbor = 0;
    vote_sum = 0.0;
    vote_distance_sum = 0.0;
    for (train=0; train<no_pats; train++)
    if (train != test)
    if (pats[0][train][col] > -9)
        {
        distance = 0.0; for (feat_tr=0; feat_tr<NO_FEATS: feat_tr++)
        col_tr = feats[feat_tr]-1;
        vtest = pats[1][test][col_tr];
        vtrain = pats[1][train][col_tr];
        if ((vtest > -9e10) && (vtrain > -9e10))
        distance+=(vtest - vtrain) * (vtest - vtrain);if ((vtest <= -9e10) && (vtrain <= -9e10))
        distance+=difmean[col_tr] * difmean[col_tr]; if ((vtest > -9e10) && (vtrain <= -9e10))
        distance+=(vtest - mean[col_tr]) * (vtest - mean[col_tr]); if ((vtest <= -9e10) && (vtrain > -9e10))
        distance+=(mean[col_tr] - vtrain) * (mean[col_tr] - vtrain);
        }
        result2[neighbor] = distance;
        result1[neighbor] = train;
        neighbor++;
    distance_weight = exp(-1.0 * distance / kernel_width); vote_distance_sum+=distance_weight;
    vote_sum+= distance_weight * pats[0][train][col];
        }
    prediction_krr = vote_sum / vote_distance_sum; if ( ((prediction_krr - 1.5) * (pats[0][test][col] - 1.5))
< 0.0) err_krr++;
    else
    cor_krr++;
    quicksort(0.neighbor-1);
    if (VERBOSITY > 5)
    for (i=0; i<neighbor,i++)
    printf("%d %d %lf %lf %lf\n", i. result[i], result2[i], pats[0][result1[i]][col]);
    for (knn_loop=0; knn_loop<NO_KNNS: knn_loop++)
        {
        knn_knn_list[knn_loop];
        if (knn <= neighbor)
            {
            vote_sum = 0.0;
            for (k=0; k<knn; k++)
            vote_sum+= pats[0][result1[k]][col]:
            prediction_knn = vote_sum/knn;
            if ( ((prediction_knn - 1.5) * (pats[0][test][col] - 1.5)) < 0.0) err_knn[knn_loop]++:
            else
            cor_knn[knn_loop]++:
                    if (VERBOSITY > 2) printf("pred_krr %8.4lf pred_knn %8.4lf true %8.4lf\n",
prediction_krr, prediction_knn. pats[0][test][col]):
                    fflush(stdout);
            }
        }
    }
print("%2d krr_accuracy %8.4lf\n", loop. (double)cor_krr)/((double)(cr_krr + err_krr))); for
(knn_loop=0; knn_loop<NO_KNNS; knn_loop++)
    if (knn_list[knn_loop] < neighbor)
printf("%2d knn_%d_accuracy %8.4lf\n", loop. knn_list[knn_loop],
((double)cor_knn[knn_loop])/((double)(cor_knn[knn_loop]+err_knn[knn_loop])));
fflush(stdout);
}
main (argc. argv)
    int argc: char **argv;
{
max_loop = MAX_LOOPS:
    no_pats = NO_PATS:
    kr_knn = 1;
kernel_width = KERNEL_WIDTH;
knn = KNN:
if (argc == 2)
    {
        printf("knn max_loops no_pats kr_knn (0=kr, 1=knn) [kernel_width]\n"); exit(0);
    }
if (argc >= 4)
    {
```

-continued

```
            max_loops = atoi(argv[1]);
            no_pats = atoi(argv[2]);
            kr_knn = atoi(argv[3]);
        }
if (argc == 5)
        if (kr_knn == 0) kernel_width = atof(argv[4]);
        else
        knn = atoi(argv[4]);
for (pat=0; pat<no_pats; pat++)
        for (col=0; col<NO_COLS: col++) scanf("%lf", &pats[0][pat][col]);
if(VERBOSITY > 1) printf("read %d patterns\n", no_pats):
for (col=0: col<NO_COLS; col++)
        {
            sum[col] = 0.0;
            sumsq[col] = 0.0;
            missing[col] = 0;
            notmissing[col] = 0;
            min[col] = +9.9e+10;
            max[col] = -9.9e+10;
        }
for (pat=0: pat<no_pats: pat++)
        for (col=0: col<NO_COLS. col++)
        {
            if(pats[0][pat][col] <= -9)
            missing[col]++;
            else
                {
                sum[col]+= pats[0][pat][col];
                sumsq[col]+= pats[0][pat][col] * pats[0][pat][col];
                notmissing[col]++;
                if (pats[0][pat][col] < min[col])
                min[col] = pats[0][pat][col];
                if (pats[0][pat][col] > max[col])
                max[col] = pat[0][pat][col];
                }
        }
if (VERBOSITY < 3) printf("\npreprocessing stats:\n");
for (col=0: col<NO_COLS; col++)
        {
            mean[col] = sum[col]/(notmissing[col]+epsilon);
sdev[col] = sqrt((sumsq[col] - (sum[col]*sum[col]/(notmissing[col]+epsilon)))/(notmissing[col]-1+epsilon));
            fmissing[col] = ((double)missing[col])/((double)(missing[col]+notmissing[col]));
if (VERBOSITY > 3) printf("col %3d; mean %8.2lf; sdev %8.2lf; min %8.2lf; max %8.2lf; missing = %4d; fmissing = %8.4lf\n",
            col+1, mean[col], sdev[col], min[col], max[col], missing[col], fmissing[col]); fflush(stdout);
            mean_pre[col] = mean[col]; sdev_pre[col] - sdev[col];
        }
for (pat=0; pat<no_pats; pat++)
        for (col=0; col<NO_COLS: col++) if (pats[0][pat][col] <= -9)
pats[1][pat][col] = -9.9e10;
        else
pats[1][pat][col] = (pats[0][pat][col] - mean[col])/(sdev[col]+epsilon);
for (col=0; col<NO_COLS: col++)
        {
            sum[col] = 0.0;
            sumsq[col] = 0.0;
            missing[col] = 0;
            notmissing[col] = 0;
            min[col] = +9.9e+10;
            max[col] = -9.9e+10;
        }
for (pat=0; pat<no_pats; pat++)
        for (col=0; col<NO_COLS; col++)
        {
            if (pats[1][pat][col] <= -9e10)
            missing[col]++;
            else
                {
                sum[col]+= pats[1][pat][col];
                sumsq[col]+= pats[1][pat][col] * pats[1][pat][col];
                notmissing[col]++;
                if (pats[1][pat][col] < min[col])
                min[col] = pats[1][pat][col];
                if (pats[1][pat][col] > max[col])
                max[col] = pats[1][pat][col];
                }
        }
if (VERBOSITY > 3) printf("\npostprocessing stats:\n");
```

-continued

```
for (col=0; col'NO_COLS; col++)
    {
        mean[col] = sum[col]/(notmissing[col]+epsilon);
sdev[col] = sqrt((sumsq[col] - (sum[col]*sum[col]/(notmissing[col]+epsilon)))/(notmissing[col]-
1+epsilon));
        fmissing[col] = ((double)missing[col])/((double)(missing[col]+notmissing[col]));
if (VERBOSITY > 3) printf("col %3d; mean %8.2lf; sdev %8.2lf; min %8.2lf; max %8.2lf; missing =
%4d; fmissing = %8.4lf\n",
        col+1, mean[col], sdev[col], min[col]; max[col], missing[col]; fmissing[col]); fflush(stdout);
    }
for (col=0: col<NO_COLS; col++)
    {
        difsum[col] = 0.0;
        difnotmissing[col] = 0;
    }
for (pat1=0; pat1<no_pats; pat1++)
    for (pat2=pat1+1; pat2<no_pats; pat2++) for (col=0; col<NO_COLS; col++)
        if (pats[1][pat1][col] > -9e10) if (pats[1][pat2][col]); difnotmissing[col]++;
            {
        difsum[col] += fabs(pats[1][pat1][col] - pats[1][pat2][col]); difnotmissing[col]++;
            }
if (VERBOSITY > 3) printf("\nmean differences stats:\n");
for (col=0; col<NO_COLS; col++)
    {
        difmean[col] = difsum[col]/(difnotmissing[col]+epsilon);
        if (VERBOSITY > 3) printf("col %3d; difnotmissing %8d; mean_diff %8.4lf\n",
col+1, difnotmissing[col], difmean[col]);
    }
fflush(stdout);
/* now do some kernel regression to fill in missing values */
for (pat=0; pat<no_pats; pat++)
    for (col=0; col<NO_COLS; col++) pats[2][pat][col] = pats[1][pat][col];
for (pat=0; pat<no_pats; pat++)
    for (col=0; col<NO_COLS; col++) pats[3][pat][col] = pats[1][pat][col];
predict_care(0);
for (loop=0; loop<max_loops; loop++)
    {
        motion_sum = 0.0;
        motion_count = 0;
        for (test=0; test<no_pats; test++)
        for (feat=0; feat<NO_FEATS; feat++)
            {
        col = feats[feat]-1;
        if(pats[0][test][col] <= -9)
            {
        vote_sum = 0.0;
        vote_distance_sum = 0.0;
        closest_distance = +9.9e10;
        for (train=0; train<no_pats; train++)
        if (train != test)
        if (pats[0][train][col] > -9)
            {
        distance = 0.0; for (feat_tr=0; feat_tr<NO_FEATS; feat_tr++)
        if (feat != feat_tr)
            {
            col_tr = feats[feat_tr]-1;
            vtest = pats[1][test][col_tr];
            vtrain = pats[1][train][col_tr];
            {
printf("test %d train %d col % d col_tr %d vtest %lf vtrain %lf\n", tset, train, col≑1, col_tr, vtest, vtrain);
fflush(stdout);
                /*
        if ((vtest > -9e10) && (vtrain > -9e10))
        distance+= (vtest - vtrain) * (vtest - vtrain); if((vtest <= -9e10) && (vtrain <= -9e10))
        distance+= difmean[col_tr] * difmean[col_tr]; if ((vtest > -9e10) && (vtrain <= -9e10))
        distance+= (vtest - mean[col_tr]) * (vtest - mean[col_tr]); if ((vtest <= -9e10) && (vtrain > -9e10))
        distance+= (mean[col_tr] - vtrain) * (mean[col_tr] - vtrain);
            }
        if (distance < closest_distance)
            {
        closest_distance = distance;
        closest_pat = train;
            }
        distance_weight = exp(-1.0 * distance/kernel_width); vote_distance_sum+= distance_weight:
        vote_sum+=distance_weight * pats[1][train][col];
            }
        prediction_krr = vote_sum / vote_distance_sum; pats[2][test][col] = prediction_krr; pats[3][test][col] =
pats[1][closest_pat][col]; if (loop == 0)
            {
```

-continued

```
if (kr_knn == 0)
motion = mean[col] - pats[2][test][col];
else
motion = mean[col] - pats[3][test][col];
            }
    else
            {
if (kr_knn == 0)
motion = pats[1][test][col] - pats[2][test][col];
else
motion = pats[1][test][col] - pats[3][test][col];
            }
    motion_sum+= fabs(motion):
    motion_count++;
if(VERBOSITY) > 2) printf("pat %4d miss_col %3d old_val %8.4lf new_val_kr % 8.4lf new_val_knn
%8.4lf motion_knn %8.4lf\n", test. col+1, pats[1][test][col], pats[2][test][col], pats[3][test][col], motion);
    fflush(stdout);
        }
    }
    printf("%2d motion %8.4lf\n", loop, motion_sum/motion_count);
    if (kr_knn == 0)
    for (pat=0; pat<no_pats; pat++) for (col=0; col<NO_COLS; col++)
                pats[1][pat][col] = pats[2]8 pat][col];
        else
for (pat=0; pat<no_pats; pat++) for (col=0; col<NO_COLS, col++)
    pats[1][pat][col] = pats[3][pat][col];
    if (VERBOSITY) > 4)
        {
    printf("write %d patterns\n", no_pats);
    for (pat=0; pat<no_pats: pat++)
        {
    for (col=0; col<NO_COLS; col++)
        if (col != 0)
        printf(", ");
        printf("%8.4lf", sdev_pre[col] * pats[1][pat][col] + mean_pre[col]);
    printf("\n");
        }
    printf("wrote %d patterns\n", no_pats);
        }
        predict_care(loop+1);
    }
}
```

What is claimed is:

1. A computer implemented method for filling in missing attribute values in a data set array of cases and attribute positions comprising the steps of:

for a first case which includes an empty attribute position, determining a first set of K nearest neighbor cases which have known values for the corresponding attribute position as the empty attribute position in the first case;

determining a filled in attribute value from the first set of K nearest neighbor cases for the empty attribute position of the first case;

determining a second set of K nearest neighbor cases to the first case which have known values for the corresponding attribute position as the empty attribute position in the first case; and revising the filled in attribute value of the first case with an attribute value determined from the second set of K nearest neighbor cases.

2. The method for filling in missing attribute values of claim 1, wherein K has a value of one and said filled in attribute value is determined by copying the attribute value of the corresponding attribute position from the nearest neighbor case.

3. The method for filling in missing attribute values of claim 1, wherein K has a value greater than one and said filled in attribute value is determined from the respective attribute values of the corresponding attribute position of the K nearest neighbor cases.

4. The method for filling in missing attribute values of claim 2, wherein said nearest neighbor case is the case with the shortest distance metric from the first case.

5. The method for filling in missing attribute values of claim 4, wherein said distance metric is calculated by taking the square root of the sum of the squared distances along each attribute.

6. The method for filling in missing attribute values of claim 5, wherein said distances along each attribute are calculated by subtracting the corresponding attribute values of the first case and another case.

7. The method for filling in missing attribute values of claim 5, wherein said distances along each attribute are calculated by subtracting the attribute value from the first case from an average attribute value of the cases in the data set not missing the attribute value.

8. The method for filling in missing attribute values of claim 5, wherein said distances along each attribute are calculated by determining the average difference for this attribute between cases in the data set.

9. The method for filling in missing attribute values of claim 3, wherein said K nearest neighbor cases are determined by calculating respective distance metrics for each remaining case from the first case.

10. The method for filling in missing attribute values of claim 9, wherein said respective distance metrics are calculated by taking the square root of the sum of the squared distances along each attribute.

11. The method for filling in missing attribute values of claim 10, wherein said distances along each attribute are calculated by subtracting the corresponding attribute values of the first case and another case.

12. The method for filling in missing attribute values of claim 10, wherein said distances along each attribute are calculated by subtracting the attribute value from the first case from an average attribute value of the cases in the data set not missing the attribute value.

13. The method for filling in missing attribute values of claim 10, wherein said distances along each attribute are calculated by determining the average difference for this attribute between cases in the data set.

14. The method for filing in missing attribute values of claim 1, further comprising the step of filling in all empty attribute positions in the data set array.

15. The method for filing in missing attribute values of claim 1, further comprising the step of repeating said determining the second set of K nearest neighbor cases step and revising step until the filled-in attribute value converges.

16. An article of manufacture comprising:

a computer usable medium having computer readable program code means embodied therein for filling in missing attribute values in a data set array of cases and attribute positions, the computer readable program code means in said article of manufacture comprising:

computer readable program code means for causing a computer to effect, for a first case which includes an empty attribute position, a determination of a first set of K nearest neighbor cases which have known values for the corresponding attribute position as the empty attribute position in the first case;

computer readable program code means for causing the computer to determine a filled in attribute value from the first set of K nearest neighbor cases for the empty attribute position in the first case;

computer readable program code means for causing the computer to determine a second set of K nearest neighbor cases to the first case which have known values for the corresponding attribute position as the empty attribute position in the first case; and computer readable program code means for causing the computer to revise the filled-in attribute value of the first case with an attribute value determined from the second set of K nearest neighbor cases.

17. The article of manufacture of claim 16, wherein K has a value of one and the computer readable program code means causes the computer to determine the filled in attribute value by copying the attribute value of the corresponding attribute position from the nearest neighbor case.

18. The article of manufacture of claim 16, wherein K has a value greater than one and the computer readable program code means causes the computer to determine the filled in attribute value from the respective attribute values of the corresponding attribute position of the K nearest neighbor cases.

19. The article of manufacture of claim 17, wherein said nearest neighbor case is the case with the shortest distance metric from the first case.

20. The article of manufacture of claim 19, wherein said distance metric is calculated by causing the computer to calculate the square root of the sum of the squared distances along each attribute.

21. The article of manufacture of claim 20, wherein said distances along each attribute are calculated by causing the computer to subtract the corresponding attribute values of the first case and another case.

22. The article of manufacture of claim 20, wherein said distances along each attribute are calculated by causing the computer to subtract the attribute value from the first case from an average attribute value of the cases in the data set not missing the attribute value.

23. The article of manufacture of claim 20, wherein said distances along each attribute are calculated by causing the computer to determine the average difference for this attribute between cases in the data set.

24. The article of manufacture of claim 18, wherein said K nearest neighbor cases are determined by causing the computer to calculate respective distance metrics for each remaining case from the first case.

25. The article of manufacture of claim 24, wherein said respective distance metrics are calculated by causing the computer to calculate the square root of the sum of the squared distances along each attribute.

26. The article of manufacture of claim 25, wherein said distances along each attribute are calculated by causing the computer to subtract the corresponding attribute values of the first case and another case.

27. The article of manufacture of claim 25, wherein said distances along each attribute are calculated by causing the computer to subtract the attribute value from the first case from an average attribute value of the cases in the data set not missing the attribute value.

28. The article of manufacture of claim 25, wherein said distances along each attribute are calculated by causing the computer to determine the average difference for this attribute between cases in the data set.

29. The article of manufacture of claim 16, further comprising:

computer readable program code means for causing the computer to fill in all empty attribute positions in the data set array.

30. The article of manufacture of claim 16, further comprising:

computer readable program code means for causing the computer to repeat said determination of the second set of K nearest neighbor cases step and to repeat said revising of the filled in attribute value of the first case step until the filled-in attribute value converges.

31. A computer system for filling in missing attribute values in a data set array of cases and attribute positions comprising:

for a first case which includes an empty attribute position, means for determining a first set of K nearest neighbor cases which have known values for the corresponding attribute position as the empty attribute position in the first case;

means for determining a filled in attribute value from the first set of K nearest neighbor cases for the empty attribute position of the first case;

means for determining a second set of K nearest neighbor cases to the first case which have known values for the corresponding attribute position as the empty attribute position in the first case; and means for revising the filled in attribute value of the first case with an attribute value determined from the second set of K nearest neighbor cases.

32. The computer system for filling in missing attribute values of claim 31, wherein K has a value of one and said filled in attribute value is determined by copying the attribute value of the corresponding attribute position from the nearest neighbor case.

33. The computer system for filling in missing attribute values of claim 31, wherein K has a value greater than one and said filled in attribute value is determined from the respective attribute values of the corresponding attribute position of the K nearest neighbor cases.

34. The computer system for filling in missing attribute values of claim 32, wherein said nearest neighbor case is the case with the shortest distance metric from the first case.

35. The computer system for filling in missing attribute values of claim 34, wherein said distance metric is calculated by taking the square root of the sum of the squared distances along each attribute.

36. The computer system for filling in missing attribute values of claim 35, wherein said distances along each attribute are calculated by subtracting the corresponding attribute values of the first case and another case.

37. The computer system for filling in missing attribute values of claim 35, wherein said distances along each attribute are calculated by subtracting the attribute value from the first case from an average attribute value of the cases in the data set not missing the attribute value.

38. The computer system for filling in missing attribute values of claim 35, wherein said distances along each attribute are calculated by determining the average difference for this attribute between cases in the data set.

39. The computer system for filling in missing attribute values of claim 33, wherein said K nearest neighbor cases are determined by calculating respective distance metrics for each remaining case from the first case.

40. The computer system for filling in missing attribute values of claim 39, wherein said respective distance metrics are calculated by taking the square root of the sum of the squared distances along each attribute.

41. The computer system for filling in missing attribute values of claim 40, wherein said distances along each attribute are calculated by subtracting the corresponding attribute values of the first case and another case.

42. The computer system for filling in missing attribute values of claim 40, wherein said distances along each attribute are calculated by subtracting the attribute value from the first case from an average attribute value of the cases in the data set not missing the attribute value.

43. The computer system for filling in missing attribute values of claim 40, wherein said distances along each attribute are calculated by determining the average difference for this attribute between cases in the data set.

44. The computer system for filing in missing attribute values of claim 31, further comprising means for filling in all empty attribute positions in the data set array.

45. The computer system for filing in missing attribute values of claim 31, further comprising means for repeating the determination of the second set of K nearest neighbor cases and repeating the revision until the filled-in attribute value converges.

* * * * *

UNITED STATES PATENT AND TRADEMARK OFFICE
CERTIFICATE OF CORRECTION

PATENT NO. : 6,047,287

DATED : April 4, 2000

INVENTOR(S) : Richard CARUANA

Page 1 of 2

It is certified that error appears in the above-indentified patent and that said Letters Patent is hereby corrected as shown below:

Title Page [56] References Cited, under U.S. PATENT DOCUMENTS, insert:
--5,990,950  11/1999    Addison..........................348/273
 5,400,300   3/1995     Bick et al.......................367/99
 5,200,931   4/1993     Kosalos et al...................367/88
 4,789,933  12/1988     Chen et al......................382/128--.

Title Page [56] References Cited, insert:
--OTHER DOCUMENTS
Tanner, M.A., "Application of Imputation to an Estimation Problem in Grouped Lifetime analysis", Technometrics, v29, n1, Feb 1987, Abstract Only.
Wong, A.K.C., et al., "Inference and Cluster Analysis of Incomplete Mixed-Mode data", IEEE Computer Soc., 1985, Abstract Only.

Column 2 Line 18 after "attribute" delete "to".

Column 5 Line 25 after "with" delete "-".

Column 8 Line 7 delete "700" insert "700".

UNITED STATES PATENT AND TRADEMARK OFFICE
CERTIFICATE OF CORRECTION

PATENT NO. : 6,047,287
DATED : April 4, 2000
INVENTOR(S) : Richard CARUANA

It is certified that error appears in the above-indentified patent and that said Letters Patent is hereby corrected as shown below:

Column 8 Line 8 delete "800" insert "800".

Column 8 Line 9 delete "700" insert "700".

Column 11 Line 48 after "described" insert "by the foregoing".

Signed and Sealed this

Third Day of April, 2001

*Attest:*

NICHOLAS P. GODICI

*Attesting Officer*  Acting Director of the United States Patent and Trademark Office